(12) United States Patent
Funada

(10) Patent No.: US 8,896,756 B2
(45) Date of Patent: Nov. 25, 2014

(54) DISPLAY APPARATUS

(71) Applicant: Canon Kabushiki Kaisha, Tokyo (JP)

(72) Inventor: Masahiro Funada, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/866,114

(22) Filed: Apr. 19, 2013

(65) Prior Publication Data

US 2013/0278836 A1 Oct. 24, 2013

(30) Foreign Application Priority Data

Apr. 24, 2012 (JP) ................................ 2012-098341

(51) Int. Cl.
*H04N 5/44* (2011.01)
*H04N 5/46* (2006.01)
*H04N 5/268* (2006.01)
*H04N 5/50* (2006.01)
*G09G 5/00* (2006.01)

(52) U.S. Cl.
CPC ................. *H04N 5/50* (2013.01); *G09G 5/006* (2013.01); *G09G 2360/02* (2013.01)
USPC ........... 348/558; 348/553; 348/555; 348/706; 348/536

(58) Field of Classification Search
USPC ......... 348/553, 554, 555, 705, 706, 500, 536, 348/731, 732
See application file for complete search history.

(56) References Cited

U.S. PATENT DOCUMENTS

| | | | | |
|---|---|---|---|---|
| 5,933,192 A * | 8/1999 | Crosby et al. | ............ | 375/240.25 |
| 6,741,288 B1 * | 5/2004 | Kessler | ...................... | 348/385.1 |
| 7,151,572 B2 * | 12/2006 | Shirahama et al. | ........... | 348/554 |
| 7,382,784 B2 * | 6/2008 | Cho et al. | ....................... | 370/397 |
| 7,405,772 B2 * | 7/2008 | Yukiyoshi | ..................... | 348/732 |
| 7,861,267 B2 * | 12/2010 | Haziza et al. | .................. | 725/46 |
| 7,872,692 B2 * | 1/2011 | Ginawi et al. | ................. | 348/731 |
| 7,916,215 B2 * | 3/2011 | Wu et al. | ....................... | 348/558 |
| 7,996,872 B2 * | 8/2011 | Levy et al. | ...................... | 725/90 |
| 8,228,444 B2 * | 7/2012 | Maruyama | ................... | 348/744 |
| 8,319,894 B2 * | 11/2012 | Funada | ......................... | 348/554 |
| 8,345,029 B2 * | 1/2013 | Yoshida et al. | ............... | 345/204 |
| 8,346,171 B1 * | 1/2013 | Mack | ........................... | 455/63.1 |
| 8,370,874 B1 * | 2/2013 | Chang et al. | .................... | 725/46 |
| 8,379,156 B2 * | 2/2013 | Nakamura et al. | ............ | 348/731 |
| 8,553,147 B2 * | 10/2013 | Funada | ......................... | 348/554 |

(Continued)

FOREIGN PATENT DOCUMENTS

| JP | 2005-215557 A | 8/2005 |
|---|---|---|
| JP | 2007-241261 A | 9/2007 |

*Primary Examiner* — Brian Yenke

(74) *Attorney, Agent, or Firm* — Rossi, Kimms & McDowell LLP

(57) ABSTRACT

A display apparatus includes an image processor commonly provided to a plurality of channels, and configured to provide processing to an image signal of a selected channel selected by a channel switch in accordance with a parameter, a parameter acquirer commonly provided to the plurality of channels, and configured to obtain the parameter in accordance with a format of the image signal of the selected channel, a memory controller configured to hold the parameter for a first channel in a memory while a detector detects the image signal in the first channel even after the channel switch switches from the first channel to a second channel, and to delete the parameter when the detector detects no image signal in the first channel, and an image processing controller configured to set the parameter to the image processor without acquiring a new parameter from the parameter acquirer.

8 Claims, 9 Drawing Sheets

(56) References Cited

U.S. PATENT DOCUMENTS

| | | | |
|---|---|---|---|
| 8,587,730 B2* | 11/2013 | Maruyama | 348/744 |
| 2002/0030764 A1* | 3/2002 | Kim et al. | 348/731 |
| 2004/0123316 A1* | 6/2004 | Kendall et al. | 725/37 |
| 2006/0184964 A1* | 8/2006 | Kim et al. | 725/39 |
| 2007/0182443 A1* | 8/2007 | Funada | 324/770 |
| 2009/0190027 A1* | 7/2009 | Delia et al. | 348/445 |
| 2011/0131603 A1* | 6/2011 | Dai | 725/38 |
| 2012/0249887 A1* | 10/2012 | HR et al. | 348/726 |
| 2013/0120653 A1* | 5/2013 | Funada | 348/503 |
| 2013/0194498 A1* | 8/2013 | Funada | 348/547 |
| 2013/0278822 A1* | 10/2013 | Funada | 348/441 |

* cited by examiner

DISPLAY APPARATUS

BACKGROUND OF THE INVENTION

1. Field of the Invention

The present invention relates to a display apparatus, such as a projective display apparatus and a liquid crystal display.

2. Description of the Related Art

The display apparatus, such as a projective display apparatus, is required to accept a wide variety of inputs, such as a digital RGB signal an analogue RGB signal for a computer, an HDMI signal and a component video signal for an audiovisual ("AV") system. These signals are often input to separate input terminals of this display apparatus, and a TMDS converter and an AD converter are provided to the display apparatus so as to convert the signal into a predefined internal transmission format and to supply the resultant signal to one signal processor. The TMDS converter converts a TMDS type image signal, such as the digital RGB signal and the HDMI signal, and the A/D converter converts an analogue image signal, such as the analogue RGB signal and the component video signal, into the internal transmission format. For a cost reduction of the display apparatus, the display apparatus may include one TMDS converter, one A/D converter, and a switch provided between these components and the input terminals. One input signal may be commonly used for the analogue RGB signal and the component video signal so as to reduce the cost and space of the terminal.

In accordance with the user's input selection, a variety of settings are made at the signal processor, the TMDS converter or A/D converter, and the switch. This type of display apparatus is demanded to shorten a time period from the input selection to a display of an image input to the input terminal, and to reduce its own cost.

For a higher switching speed, Japanese Patent Laid-Open No. ("JP") 2005-215557 does not use the common A/D converter but uses dedicated A/D converters for similar image signals, such as the analogue RGB signal and the component video signal. JP 2007-241261 discloses a method that uses a common input terminal to the analogue RGB signal and the component video signal, and identifies an input signal based upon a type and a frequency of a synchronizing signal of the input signal.

However, JP 2005-215557 needs a dedicated signal format converter, etc. for each input terminal, and causes an increase in cost as the input terminal increases. Even in JP 2007-241261, when there are provided a plurality of input terminals each of which is common to the analogue RGB signal and the component video signal, a plurality of type determiners and a plurality of frequency measuring units of the synchronizing signal are required and the cost will increase.

SUMMARY OF THE INVENTION

The present invention provides a display apparatus that can shorten a time period from a selection of an input signal to its display and reduce costs.

A display apparatus according to the present invention is configured to display an image corresponding to an image signal. The display apparatus includes a channel switch configured to select one of a plurality of channels by switching the channel for the image signal to be input, a detector configured to detect whether or not there is the image signal in the channel, an image processor commonly provided to the plurality of channels, and configured to provide processing to the image signal of a selected channel selected by the channel switch in accordance with a parameter, a parameter acquirer commonly provided to the plurality of channels, and configured to obtain the parameter in accordance with a format of the image signal of the selected channel, a memory controller configured to store the parameter obtained by the parameter acquirer in a storage area in a memory corresponding to the selected channel, and to hold the parameter for a first channel in the memory while the detector detects the image signal in the first channel even after the channel switch switches from the first channel to a second channel, the memory controller being further configured to delete the parameter for the first channel in the memory when the detector detects no image signal in the first channel, and an image processing controller configured to read the parameter and set the parameter to the image processor without acquiring a new parameter from the parameter acquirer when the parameter for the selected channel is stored in the memory.

Further features of the present invention will become apparent from the following description of exemplary embodiments with reference to the attached drawings.

DESCRIPTION OF THE EMBODIMENTS

A detailed description will be given of embodiments of the present invention, with reference to the accompanying drawings.

First Embodiment

Figure 1:
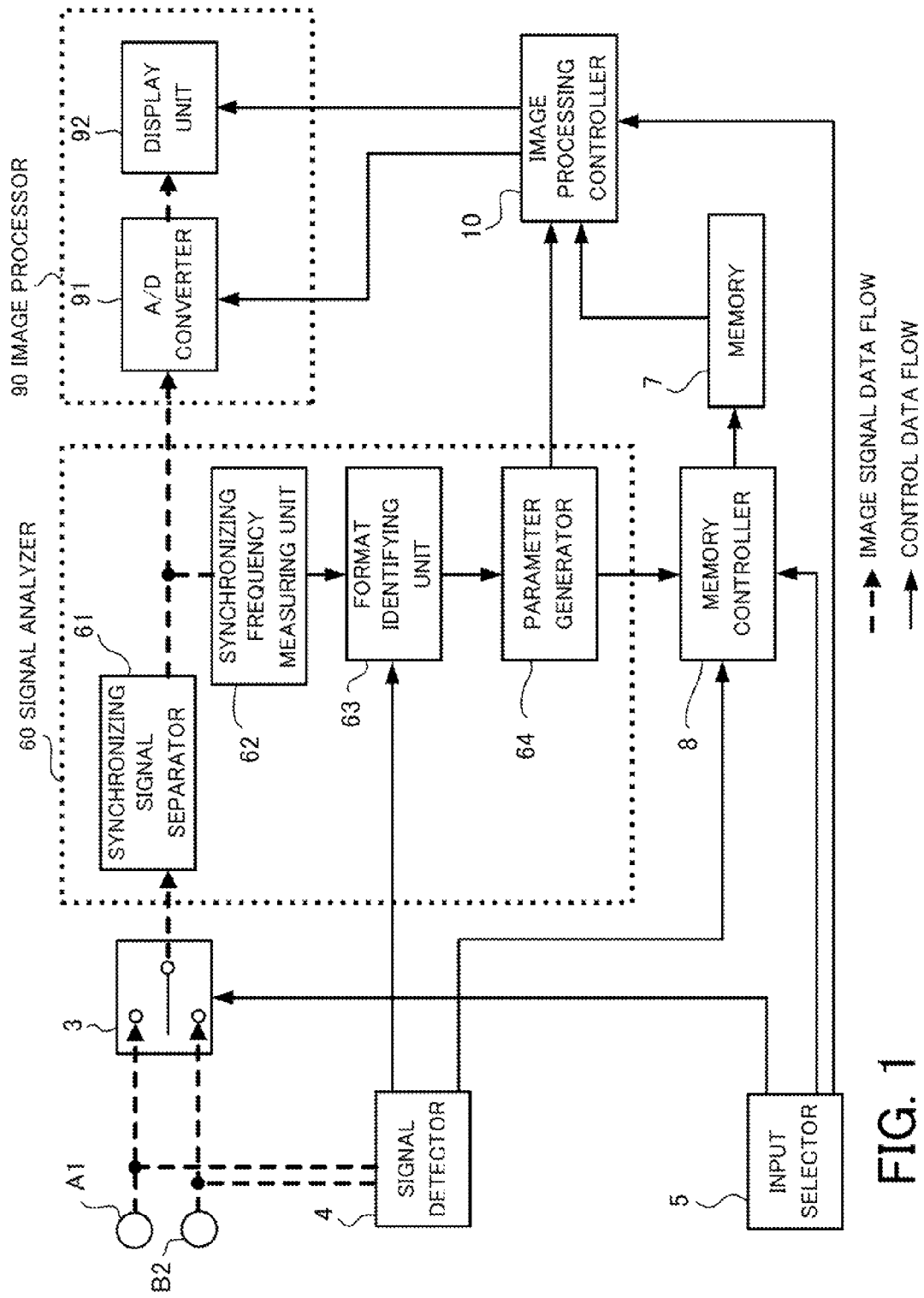
FIG. 1 is a block diagram of a display apparatus according to a first embodiment of the present invention.

FIG. 1 is a block diagram of a display apparatus according to a first embodiment. The display apparatus displays an image corresponding to an image signal. The display apparatus includes an input terminal A1, an input terminal B2, a switch 3, a signal detector 4, an input selector 5, a signal analyzer 60, a memory 7, a memory controller 8, an image processor 90, and an image processing controller 10. The display apparatus of this embodiment is applicable to a projective display apparatus and a liquid crystal display, such as a liquid crystal projector and a digital light processing ("DLP") projector.

Each of the input terminals A1 and B2 is a D-sub15 pin terminal and serves as an input terminal for an analogue RGB signal for a computer and a component video signal for an AV system. In other words, two types of image signals can be input to each of the input terminals A1 and B2. Each input terminal has five types of signal inlets, such as a horizontal synchronizing signal line, a vertical synchronizing signal line, an R(Cr) signal line, a G(Y) signal line, and a B(Cb) signal line, and is connected to the computer or the AV system. Thus, the display apparatus of this embodiment includes a plurality of input terminals. At least one type of image signal is input to each input terminal, and an image signal contains a synchronizing signal.

The input terminal and the image signal input to it are specified by a signal channel. For example, the analogue RGB signal input to the input signal A1 and the component video ("CV") signal input to the input terminal A1 pass different channels. In order to display the image signal in an appropriate format, it is necessary to process the image signal utilizing a parameter suitable for a format of the synchronizing signal.

The switch 3 serves as a channel switch configured to switch a channel, selects one image channel among the input terminals A1 and B2 in accordance with a command form the input selector 5, and outputs the image signal of the selected input terminal.

The signal detector 4 detects whether or not there is an image signal in the channel. The signal detector 4 of this embodiment monitors the horizontal synchronizing signal line, the vertical synchronizing signal line, and the G(Y) signal line of each of the input terminals A1 and B2, and detects whether or not there is a synchronizing signal. When the polarity, period or type of the synchronizing signal changes, the signal detector 4 may output a detection result indicating that there is no synchronizing signal, and then output a detection result indicating that there is a synchronizing signal after determining that the state becomes stable. The synchronizing signal to be detected may contain a horizontal/vertical separating synchronizing signal containing the horizontal synchronizing signal from the horizontal synchronizing signal line and the vertical synchronizing signal from the vertical synchronizing signal line, a sink on green ("SOG") signal as a complex synchronizing signal input to the G(Y) signal line, and a complex synchronizing signal from the horizontal synchronizing signal line.

The signal detector 4 of this embodiment detects whether or not there is an image signal for each of the plurality of channels, but this configuration is not essential. For instance, assume that the switch 3 switches from a first channel to a second channel and then again to the first channel, and that the input signal of the first channel is continuously detected before and after the switching. In this case, this embodiment analyzes the input signal of the first channel before switching, and uses the parameter that has been generated and stored in the memory 7 as the parameter for the first channel after the switching (without newly analyzing the input signal). In other words, in this case, it is sufficient that the signal detector 4 detects whether or not there is an image signal in the first channel.

The input selector 5 serves as an input selector configured to select an input signal to be displayed on the display apparatus, and manipulated by a user. In this embodiment, the selectable input signals are the analogue RGB signal A and CV signal A input from the input signal A1, and the analogue RGB signal B and CV signal B input from the input signal B2. However, the type of the input signal is not limited to these signals. A more specific selecting method may utilize, but is not limited to, an operational button (not illustrated) and a menu operation on an on-screen display ("OSD").

The signal analyzer 60 is provided commonly to a plurality of channels, analyzes an image signal (or a synchronizing signal contained in the image signal), and acquires a parameter in accordance with a format of the synchronizing signal for the image signal of the channel switched and selected by the switch 3. The signal analyzer 60 of this embodiment includes a synchronizing signal separator 61, a synchronizing frequency measuring unit 62, a format identifying unit 63, and a parameter generator 64.

The synchronizing signal separator 61 outputs the horizontal/vertical separating synchronizing signal when that signal is being input. When a SOG signal is input rather than the horizontal/vertical separating synchronizing signal, the synchronizing signal separator 61 separates the horizontal/vertical separating format from the SOG signal and outputs the horizontal/vertical separating signal. The synchronizing signal separator 61 outputs an image signal other than the synchronizing signal without processing it. In this embodiment, the signal detector 4 identifies a type of the synchronizing signal, but the synchronizing signal separator 61 may do it instead.

The synchronizing frequency measuring unit 62 receives the horizontal synchronizing signal and the vertical synchronizing signal, measures each frequency (or period), and informs the format identifying unit 63 of the result.

The format identifying unit 63 identifies (specifies) the format of the image signal based upon the synchronizing signal detected by the signal detector 4 (or synchronizing signal separator 61) and the horizontal and vertical synchronizing signals measured by the synchronizing frequency measuring unit 62. The format is expressed as a format ID that is uniquely defined by the type of the synchronizing signal, the horizontal synchronizing signal frequency (or period), and the vertical synchronizing signal frequency (or period). The format identifying unit 63 informs the parameter generator 64 of the obtained format ID.

The parameter generator 64 generates a variety of types of parameters applied to the A/D converter 91 and the display unit 92. When the generation of the format is completed, the parameter generator 64 outputs it to the image processing controller 10 and the memory controller 8. The generation of the parameter relies upon a variety of types of set values used to change the display state by the user utilizing the menu (not illustrated), and the format ID determined by the format identifying unit 63. The "variety of types of set values" contain an aspect ratio, a gamma set value, and another value set in the display unit. A set parameter for the A/D converter 91 contains a sampling frequency, etc. used for the clamp level and the A/D conversion. The parameter generator 64 may generate a parameter through a calculation or a table. It is sufficient that the parameter generator 64 serves as a parameter acquirer configured to acquire a parameter.

The memory 7 serves as a storing unit. A storage area in the memory 7 is segmented for each channel selectable by the switch 3, and the parameter is stored or cleared (deleted) in each storage area under control of the memory controller 8, which will be described later. The stored parameter is output in response to a request for a parameter by the image processing controller 10, which will be described later. When the parameter has already been cleared, a reply indicative of clearing is issued. Instead of segmenting the storage area for each image channel, the storage area may be segmented for each input signal selectable by the input selector 5.

The memory controller 8 designates the storage area in the memory 7, and stores the parameter generated by the parameter generator 64 in the storage area corresponding to a channel in the memory 7. The memory controller 8 holds the parameter in the memory 7 while the signal detector 4 detects an image signal in a first channel. When the signal detector 4 detects no image signal in the first channel, the memory controller 8 clears (deletes) the information of the parameter in the storage area in the memory 7. The storage area in storing the parameter is designated based upon the input signal selected by the input selector 5. The storage area in clearing the parameter is determined not based upon the input signal selected by the input selector 5, but based upon the channel that is determined to have no synchronizing signal by the signal detector 4. A detailed flow will be described later.

The image processor 90 is commonly provided to a plurality of channels, provides processing to the image signal for the channel switched by the switch 3 in accordance with the parameter, and includes an A/D converter 91 and a display unit 92.

The A/D converter 91 provides an analogue-to-digital conversion to an analogue image signal utilizing the parameter, such as a sampling frequency and a clamp level set by the image processing controller 10, and converts the analogue image signal into a digital image signal.

The display unit 92 includes an image display device having a plurality of neighboring pixels, and displays an input digital image signal as an optical image. The display unit 92 serves as a resolution converter, a gamma adjuster, etc., and the set parameter is controlled by the image processing controller 10.

The image processing controller 10 controls the A/D converter 91 and the display unit 92 in accordance with the input signal selected by the input selector 5 and the parameter supplied by the parameter generator 64 or the memory 7. A detailed flow from acquisition to setting of the parameter will be given later.

Figure 2:
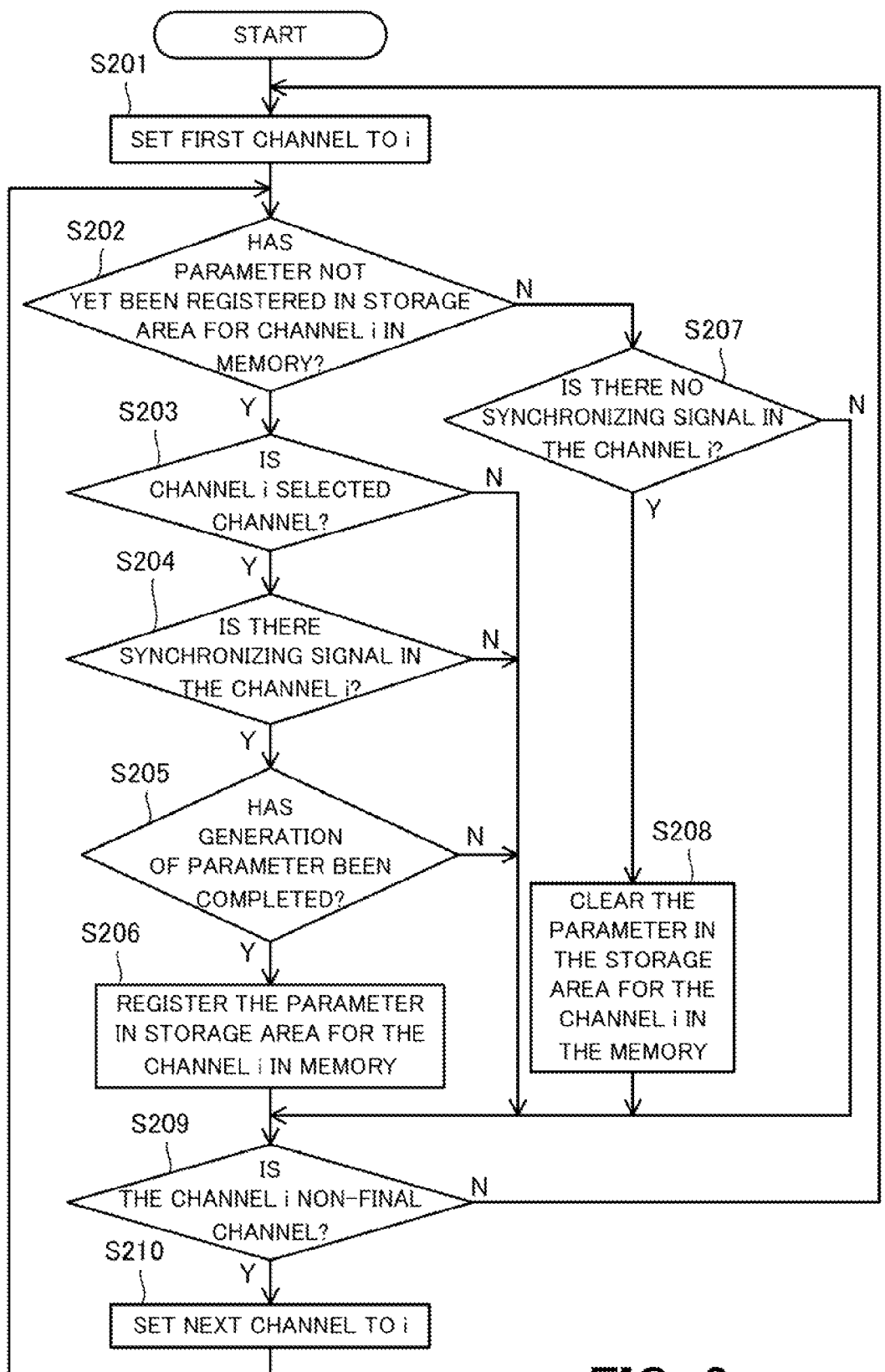
FIG. 2 illustrates a control flow by a memory controller illustrated in FIG. 1 according to the first embodiment.

FIG. 2 illustrates a control flow performed by the memory controller 8. In FIG. 2, "S" stands for the step. "Y" means "Yes," and "N" means "No." This is true of other flowcharts. The flowchart illustrated in FIG. 2 can be implemented as a program that enables a computer to execute a function of each step. This is true of the other flowcharts.

In S201, a first channel (such as one of channels corresponding to the above four signals) is set to a variable i. In S202, it is determined whether a parameter has not yet been registered in the storage area for the channel i in the memory 7. When it is unregistered, then the flow goes to S203, and when the parameter has already been registered, the flow goes to S207.

In S203, when the channel i accords with a channel of the input signal selected by the input selector 5, then the flow goes to S204, and when the channel i does not accord with that channel, then the flow goes to S209. In S204, the signal detector 4 determines whether or not there is a synchronizing signal in the channel i. When there is the synchronizing signal, the flow moves to S205, and when there is no synchronizing signal, the flow moves to S209.

In S205, it is determined whether or not the generation of the parameter by the parameter generator 64 has been completed. When the generation of the parameter has already been completed, the flow moves to S206, and when the generation of the parameter has not yet been completed, the flow moves to S209. In S206, the parameter output from the parameter generator 64 is stored in the storage area for the channel i in the memory 7.

In S207, the signal detector 4 determines whether or not there is a synchronizing signal in the channel i. When there is no synchronizing signal, then the flow goes to S208, and when there is a synchronizing signal, then the flow goes to S209. In S208, the parameter stored in the storage area for the channel i in the memory 7 is cleared. Thus, when the signal detector 4 does not detect the image signal in the channel i (Y of S207), the parameter information is deleted in the storage area in the memory 7 (S208). While the signal detector 4 detects the image signal in the channel i (N of S207), the parameter is held in the memory 7.

In S209, it is determined whether or not the channel i is a final channel. When it is not a final channel, then the next channel is set to the variable i (S210) and the flow returns to S202. When the channel is a final channel, then the flow goes back to S201 and the first channel is set to the variable i. The above control flow can maintain an appropriate state in the memory 7 when the existence or nonexistence state of the input signal changes.

Figure 3:
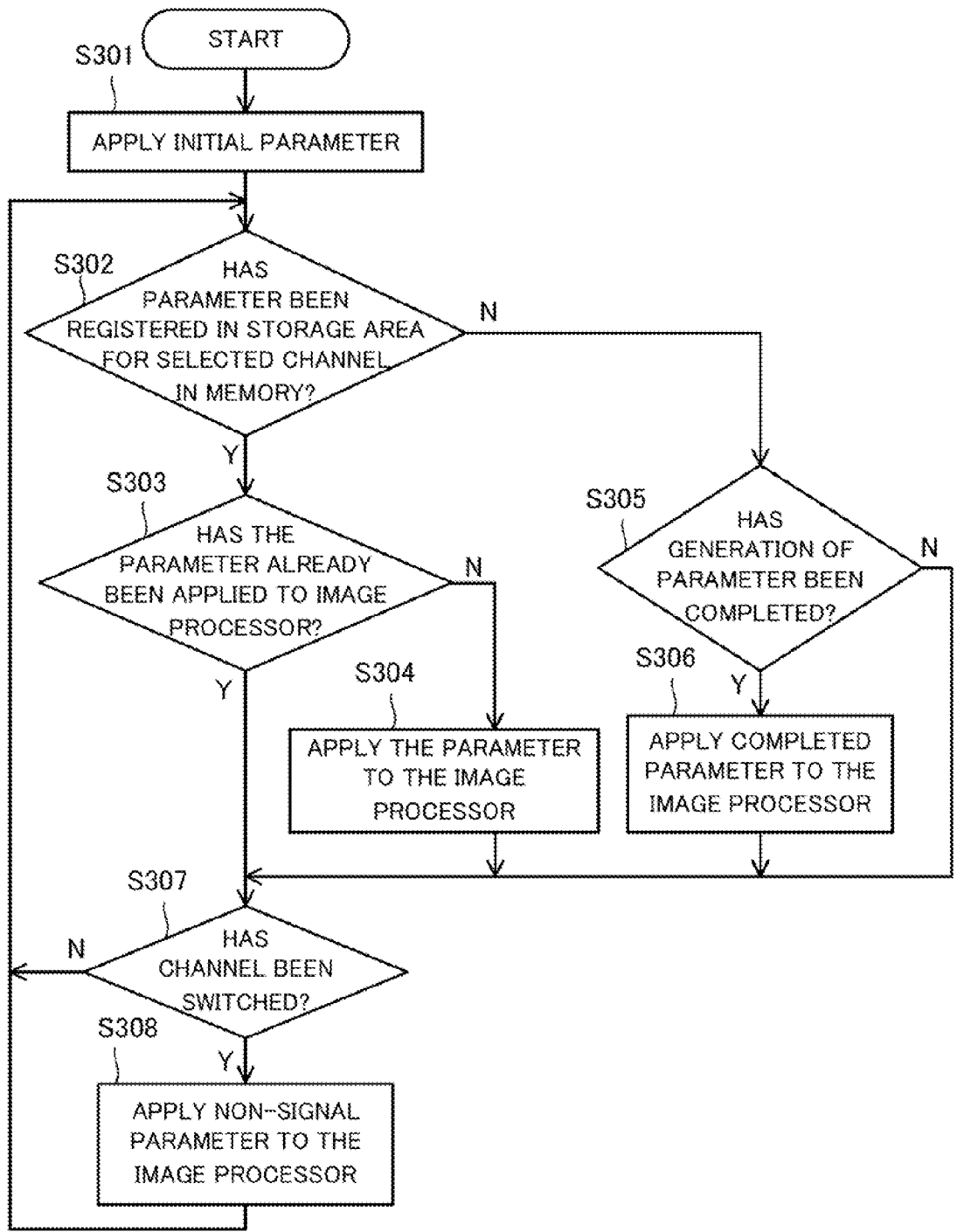
FIG. 3 illustrates a control flow by an image processing controller illustrated in FIG. 1 according to the first embodiment.

FIG. 3 illustrates a control flow performed by the image processing controller 10.

S301 corresponds to control when the display apparatus is run, and initializes the image processor 90 utilizing the predetermined initial parameter. In S302, it is determined whether or not the parameter has already been registered in the storage area in the memory 7, which corresponds to a (selected) channel for the input signal selected by the input selector 5. When the parameter has already been registered, the flow goes to S303, and when the parameter has not yet been registered, the flow moves to S305.

In S303, it is determined whether or not the parameter acquired from the memory 7 has already been applied to the A/D converter 91 and the display unit 92. When it has not yet been applied, the flow moves to S304 so as to apply the parameter, and when it has already been applied, the flow moves to S307.

In S305, it is determined whether or not the generation of the parameter by the parameter generator 64 has been completed. When the generation of the parameter has already been completed, then the completed parameter is applied to the A/D converter 91 and the display unit 92 in S306, and when the generation of the parameter has not yet been completed, then the flow moves to S307.

In S307, it is determined whether the channel has been changed from the previous one. When the channel has been switched, then a predetermined non-signal parameter is applied to the A/D converter 91 and the display unit 92 in S308, and when the channel has not yet been switched, then the flow returns to S302. The above control flow applies the proper parameter to the A/D converter 91 and the display unit 92 when the existence or nonexistence state of the input signal changes or the input selection is changed.

Assume that the switch 3 switches from a first channel to a second channel and then to the first channel again while the input signal for the first channel is continuously detected before and after the switching. For example, the analogue RGB signal A is input to the input terminal A1 (first input terminal), the CV signal B is simultaneously input to the input terminal B2 (second input terminal), and both signals are continuously input. Initially, the switch 3 selects the analogue RGB signal A, then CV signal B, and thereafter the analogue RGB signal A again.

This embodiment analyzes the input signal to the first channel before the switching, and prepares and registers the parameter in the storage area for the first channel in the memory 7 (S206). In addition, this embodiment applies the parameter stored in the memory 7 for the input signal to the first channel after the switching (without newly acquiring the parameter for the input signal) (S304). As a result, the analysis processing by the signal analyzer 60 can be omitted. Moreover, when it is necessary to change the parameter, the non-signal is detected by the signal detector 4, and the parameter is cleared. Therefore, an improper parameter is never applied.

This embodiment clears the parameter in the memory 7 (S208), when the channel is switched from the first channel to the second channel and then to the first channel again by the switch 3, and when the input signal to the first channel is not continuously detected. For example, this is a case where an input of the analogue RGB signal A is stopped after the analogue RGB signal A is switched to the CV signal B, then the analogue RGB signal A is again input, and thereafter the switch 3 selects it. In this case, it is less reliable that the input signal after the first channel is switched is the pre-switching input signal.

Thus, this embodiment commonly uses the signal analyzer 60 and the image processor 90 for a plurality of channels, reducing the cost. In addition, this embodiment omits new analyzing processing by the signal analyzer 60, shortening the time period from the input selection to the display. Furthermore, this embodiment secures the reliability of the display format when the time period is shortened.

While this embodiment utilizes a D-Sub15 pin terminal for each of the input terminals A1 and B2, a DVI-I terminal and a 5BNC terminal can provide similar effects. In addition, while this embodiment utilizes two input terminals and four types of input signals, the increased number of input terminals and the increased number of types of input signals can provide similar effects. While this embodiment is applied to an analogue image signal, the present invention is applicable to a digital signal, such as a DVI and an HDMI signal. In this case, the signal analyzer 60 is replaced with a TMDS receiver or an HDMI receiver, and the signal detector 4 is replaced, for example, with a circuit configured to monitor a 5V Power line.

Second Embodiment

Figure 4:
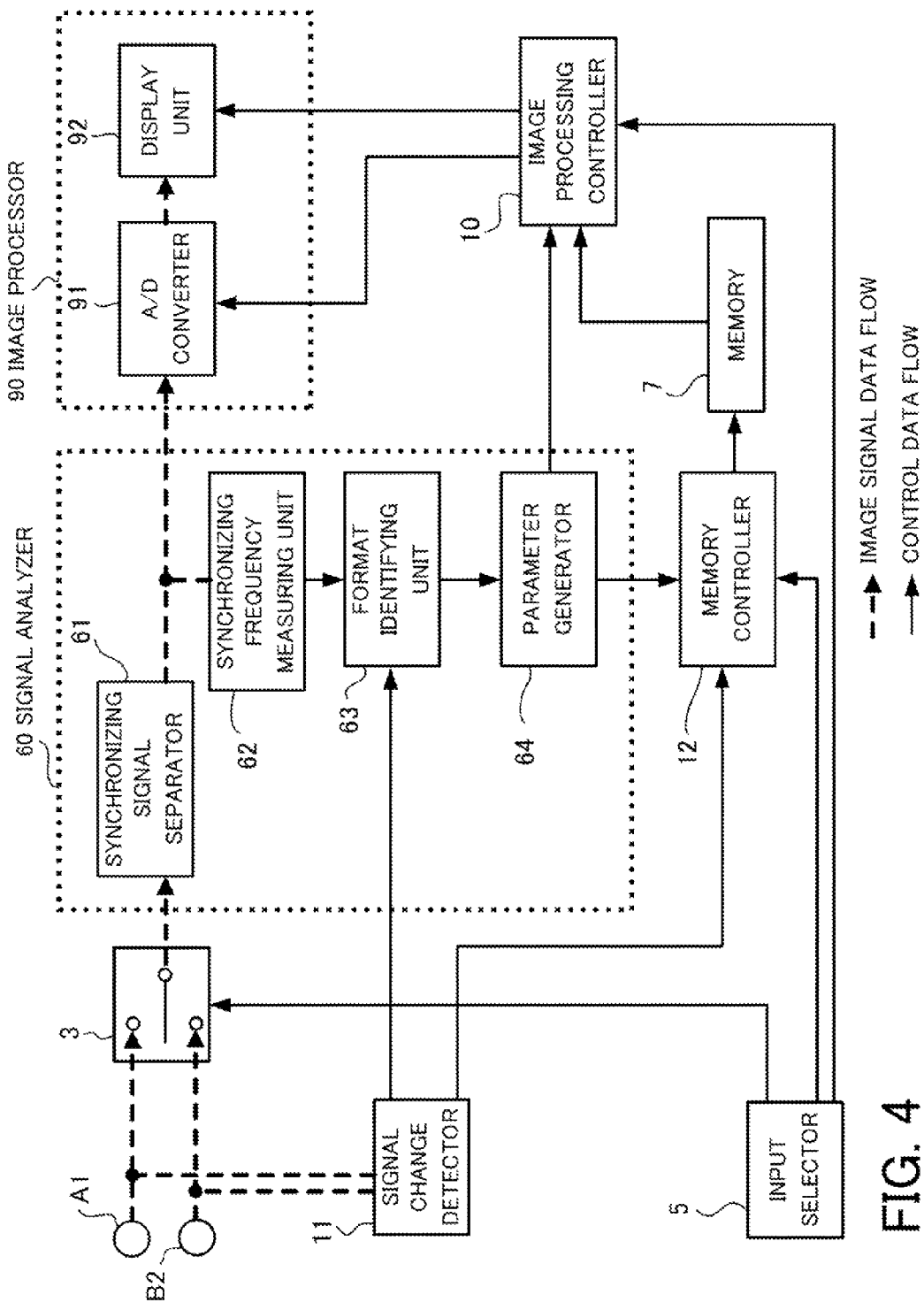
FIG. 4 is a block diagram of a display apparatus according to a second embodiment of the present invention.

FIG. 4 is a block diagram of a display apparatus according to a second embodiment. This embodiment is different from the first embodiment in that the signal detector 4 and the memory controller 8 are replaced with a signal change detector 11 and a memory controller 12.

The signal change detector 11 detects whether or not there is an image signal in the channel and whether the image signal (or a synchronizing signal included in the image signal) changes. In other words, the signal change detector 11 has a signal change detecting function in addition to a function of the signal detector 4.

The signal change detector 11 of this embodiment monitors the horizontal and vertical synchronizing signal lines and the G(Y) signal line of each of the input terminals A1 and B2, and determines whether or not there is a synchronizing signal and detects the polarity of the synchronizing signal, the horizontal synchronizing period, the vertical line number, and a change of the type of the synchronizing signal. Similar to the first embodiment, it is not always necessary to detect an image signal and a signal change for each of a plurality of channels.

Herein, the vertical line number is a counted value of the number of horizontal synchronizing signal pulses in one vertical synchronizing signal period. A type of the applicable synchronizing signal is equivalent with that for the signal detector 4. The signal change detector 11 informs the memory controller 12 of the channel with the change when the synchronizing signal changes from the existence state to the nonexistence state or from the nonexistence state to the existence state, or when the period of the synchronizing signal, the horizontal synchronizing period, the line number or the type of the synchronizing signal changes while there is a synchronizing signal. Whether or not there is a synchronizing signal may be output in response to an inquiry from the memory controller 12.

The memory controller 12 basically serves as the memory controller 8, but the operation of the memory controller 12 is different from that of the memory controller 8 since the signal detector 4 is replaced with the signal change detector 11.

Figure 5:
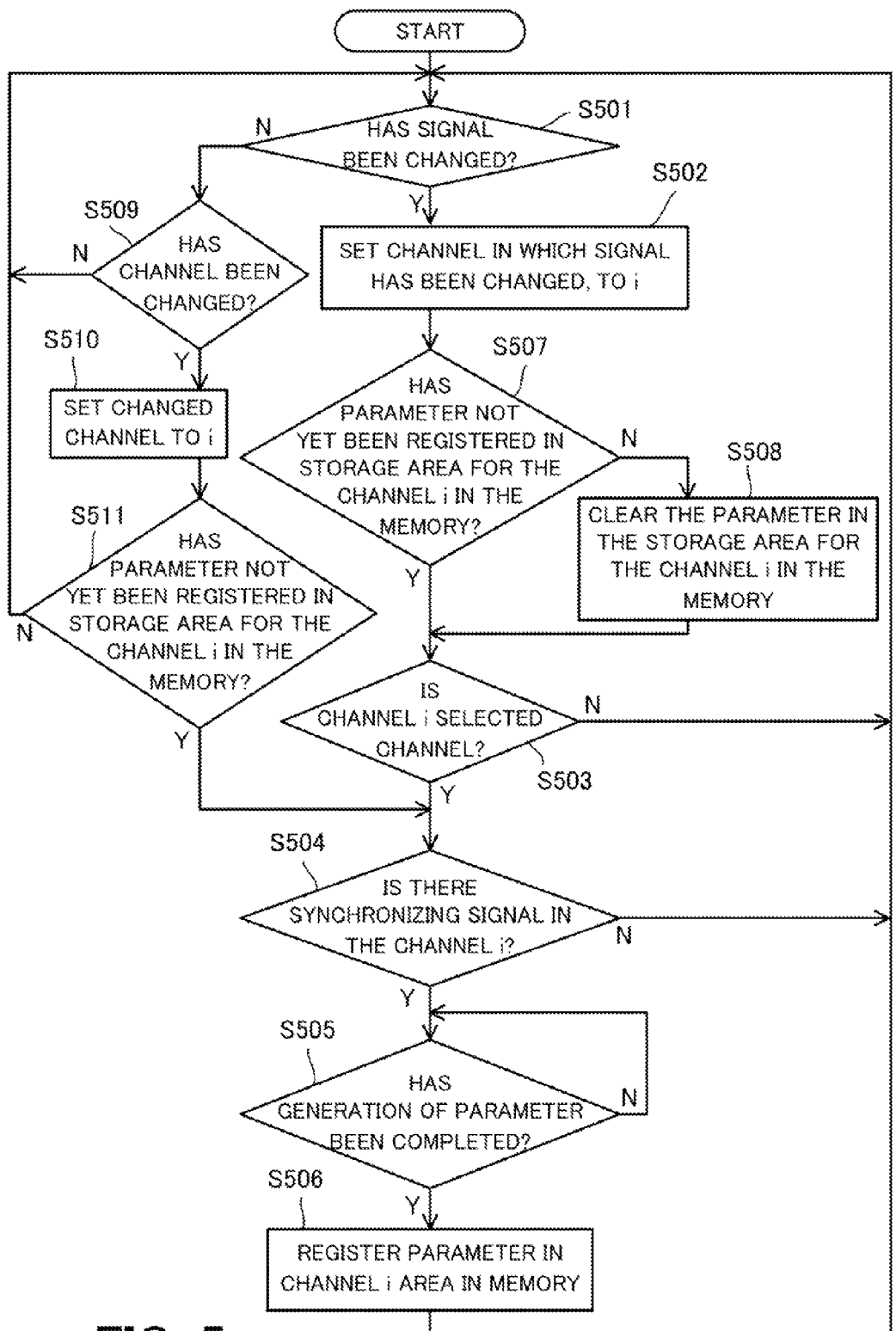
FIG. 5 illustrates a control flow by a memory controller illustrated in FIG. 4 according to the second embodiment.

FIG. 5 illustrates a control flow of the memory controller 12.

In S501, it is determined whether the signal change detector 11 detects a change. When the change occurs, then the flow moves to S502, and when the change does not occur, then the flow moves to S509. In S502, a channel having a signal change detected by the signal change detector 11 is set to a variable i. Then, the flow moves to S507.

In S507, when the parameter has not yet been registered in the storage area for the channel i in the memory 7, then the flow moves to S503, and when the parameter has already been registered, the flow goes to S508. In S508, the parameter stored in the storage area for the channel i in the memory 7 is cleared. Then, the flow goes to S503.

In S503, when the channel i accords with a channel for the input signal selected by the input selector 5, then the flow goes to S504, and when the channel i does not, then the flow returns to S501.

In S504, the signal change detector 11 determines whether or not there is a synchronizing signal in the channel i. When there is the synchronizing signal, the flow moves to S505, and when there is no synchronizing signal, the flow returns to S501. In S505, the flow stands by until the generation of the parameter by the parameter generator 64 is completed, and the flow moves to S506 after the completion. In S506, the parameter output from the parameter generator 64 is stored in the storage area for the channel i in the memory 7.

In S509, it is determined whether the input signal channel selected by the input selector 5 has been changed. When the change occurs, the flow moves to S510, and when no change occurs, the flow moves to S501.

In S510, a channel newly set by the input selector 5 is set to the variable i. In S511, when a parameter has not yet been registered in the storage area for the channel i in the memory 7, the flow moves to S504, and when the parameter has already been registered, the flow returns to S501. The above control flow maintains an appropriate state in the memory 7 when the state of the input signal changes or the input selection changes.

When the synchronizing signal of the input image signal changes seamlessly, this embodiment can set the parameter to the memory 7 more quickly than the first embodiment.

While the signal change detector 11 of this embodiment informs the memory controller 12 of a change when the change occurs, the memory controller 12 may periodically inquire the signal change detector 11 about the change. In this case, the change means a change from the state at the previous inquiry.

Third Embodiment

Figure 6:
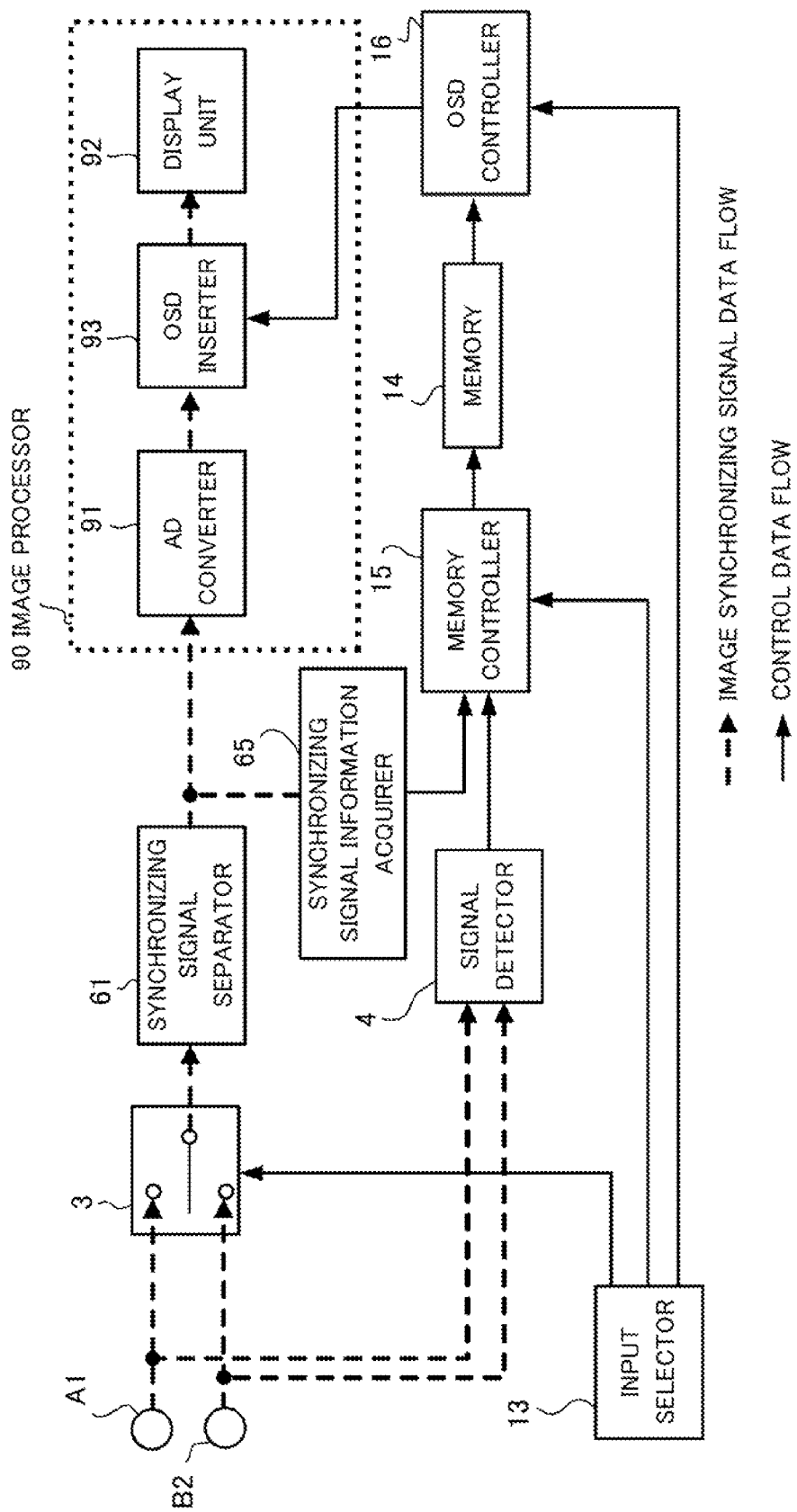
FIG. 6 is a block diagram of a display apparatus according to a third embodiment of the present invention.

FIG. 6 is a block diagram of a display apparatus according to a third embodiment. The display apparatus includes an input terminal A1, an input terminal B2, a switch 3, a signal detector 4, an input selector 13, a synchronizing signal separator 61, a synchronizing signal information acquirer 65, a memory 14, a memory controller 15, an image processor 90, and an OSD controller 16. The input terminal A1, the input terminal B2, the switch 3, the signal detector 4, and the synchronizing signal separator 61 are equivalent to those of the first embodiment, and a description thereof will be omitted.

The input selector 13 is operated by the user, and selects an input signal to be displayed by the display apparatus. Similar to the first embodiment, there are four selectable types of input signals, such as an analogue RGB signal A and the CV signal A input from the input terminal A1 and the analogue RGB signal B and the CV signal B input from the input terminal B2. A user's actual operation in the input selection is a manipulation of an input selecting menu displayed on an OSD inserter 93 (which will be described later) utilizing an input selecting button, an UP button, a DOWN button, and a SET button, which are not illustrated.

The synchronizing signal information acquirer 65 acquires synchronizing signal information that contains a horizontal synchronizing pulse number (vertical line number) per one vertical synchronizing signal for an image signal of the selected channel selected by the switch 3, and outputs the result to the memory controller 15. The vertical synchronizing period or vertical synchronizing frequency can be substituted. The horizontal synchronizing signal period may be measured and output to the memory controller 15.

A storage area in the memory 14 is segmented for each image channel selectable by the switch 3, and the parameter is stored or cleared (deleted) from each area under control of the memory controller 15, which will be described later. The stored synchronizing signal information is output in response to a request for synchronizing signal information by the OSD controller 16, which will be described later. When the synchronizing signal information has been cleared, the reply indicative of clearing is issued. The storage area may be segmented for each input signal selectable by the input selector 13.

The memory controller 15 stores or clears the type of the synchronizing signal detected by the signal detector 4 and the vertical line number measured by the synchronizing signal information acquirer 65 as synchronizing signal information in the storage area for the selected channel in the memory 14. The storage area in storing the synchronizing signal information depends upon the input signal selected by the input selector 13, but the storage area in clearing the synchronizing signal information depends not upon the input signal selected by the input selector 13 but upon an image channel that is determined to have no synchronization signal by the signal detector 4. A detailed flow will be described later.

The image processor 90 includes an A/D converter 91, a display unit 92, and an OSD inserter 93. Since the A/D converter 91 and the display unit 92 are similar to those of the first embodiment, a detailed description thereof will be omitted.

The OSD inserter 93 is controlled by the OSD controller 16, which will be described later, and can insert the input selecting menu.

The OSD controller 16 controls the input selecting menu. The input selecting menu displays a result of determining whether or not there is an input signal and a type of the currently selected input signal for all types of the input signal selectable by the input selector 13.

Figure 7:
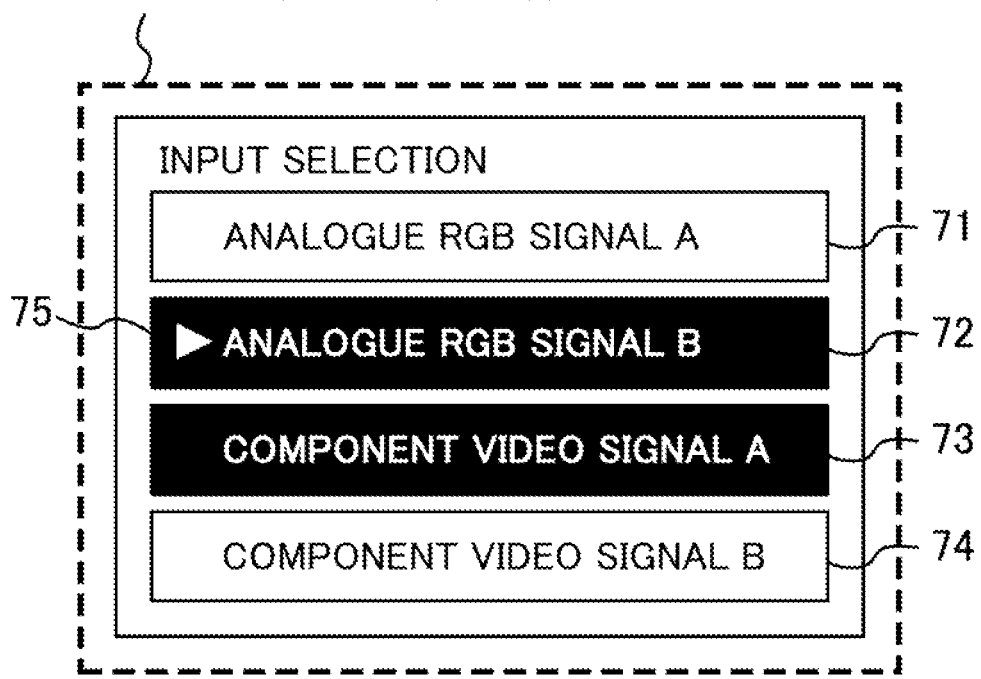
FIG. 7 illustrates an input selecting menu of the display apparatus illustrated in FIG. 6 according to the third embodiment.

FIG. 7 illustrates one illustrative input selecting menu. The input selecting menu 70 includes an analogue RGB signal A option 71, an analogue RGB signal B option 72, a CV signal A option 73, a CV signal B option 74, and an input selecting signal cursor 75. The letter color of each option indicates a determining result of whether there is an input signal. A highlighted option means that there is an input signal, and a non-highlighted option means that there is no input signal. A flow of determining whether or not there is an input signal will be described later. The structure illustrated in FIG. 7 is merely illustrative and non-restrictive.

When the user changes an input selection, the user presses an input selecting button. Then, whether there is an input signal is determined, and the input selecting menu 70 that reflects the result is displayed. The input option signal cursor 75 is displayed on the left of the currently selected input signal. When the user presses an UP (or DOWN) button, the input option signal cursor 75 moves up or down to the option. When the SET button is pressed after an arbitrary option is selected, an input is selected. The user can easily make a selection because he can recognize a type of an input signal and the result of determining whether there is the input signal before he makes the selection.

Figure 8:
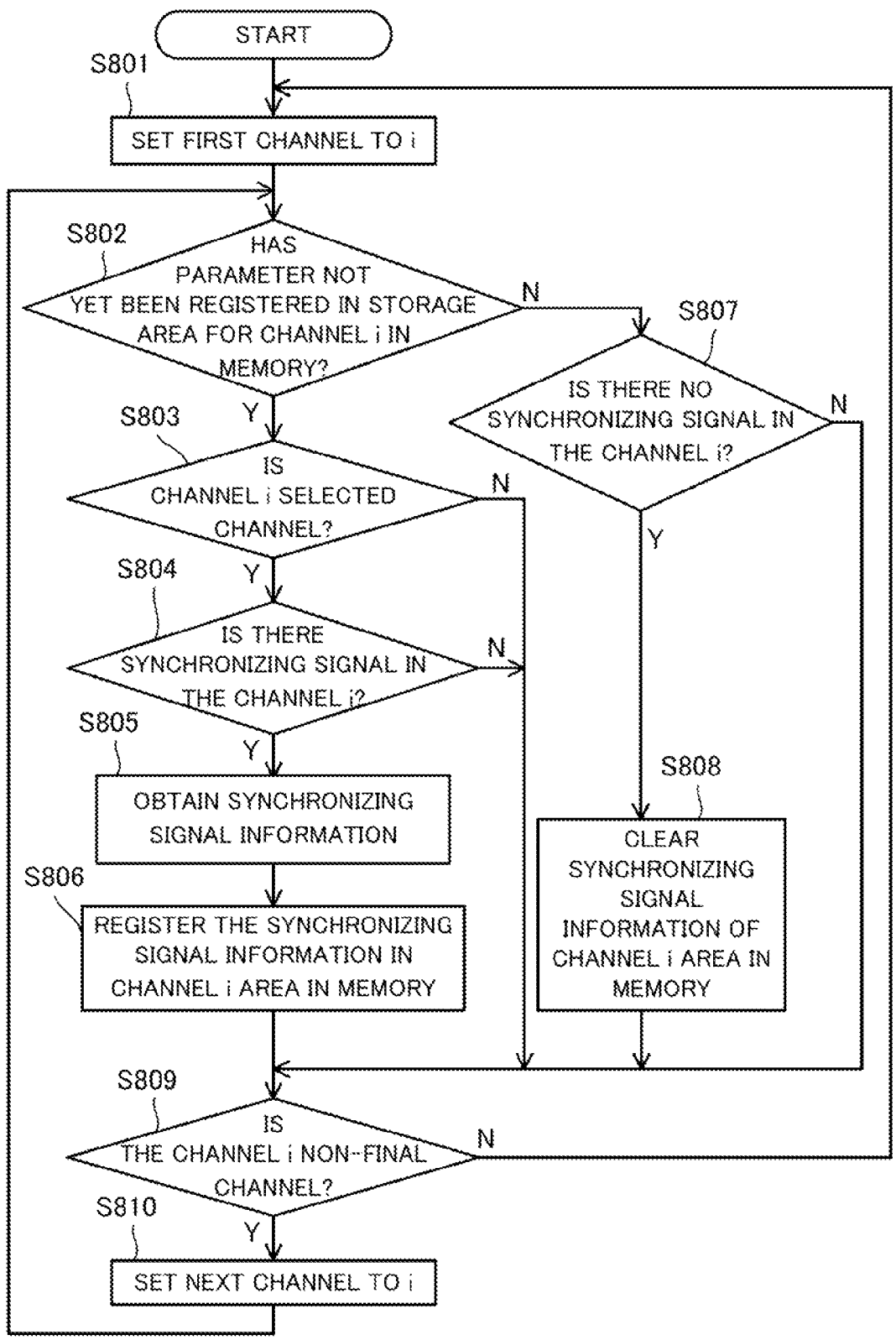
FIG. 8 illustrates a control flow by a memory controller illustrated in FIG. 6 according to the third embodiment.

FIG. 8 illustrates a control flow by the memory controller 15. In S801, a first channel is set to a variable i. In S802, the storage area for the channel i in the memory 14 is checked. When the synchronizing signal information has not yet been registered, then the flow moves to S803, and when the synchronizing signal information has been registered, then the flow moves to S807. In S803, when the channel accords with the input signal channel selected by the input selector 13, then the flow moves to S804, and when the channel i does not, then the flow moves to S809. In S804, the signal detector 4 determines whether or not there is a synchronizing signal in the channel i. When there is the synchronizing signal, then the flow moves to S805, and when there is no synchronizing signal, then the flow moves to S809. In S805, the synchronizing signal information is acquired from the synchronizing signal information acquirer 65. In S806, the synchronizing signal information output from the synchronizing signal information acquirer 65 is stored in the storage area for the channel i in the memory 14. In S807, the signal detector 4 determines whether or not there is a synchronizing signal in the channel i. When there is no synchronizing signal, then the flow goes to S808, and when there is a synchronizing signal, then the flow goes to S809. In S808, the synchronizing signal information stored in the storage area for the channel i in the memory 14 is cleared. In S809, it is determined whether or not the channel i is a final channel. When it is not a final channel, then the next channel is set to the variable I in S809 and the flow moves to S802, and when the channel i is a final channel, the flow returns to S801 and the first channel is set to the variable i. The above control flow can maintain an appropriate state in the memory 14 when the existence or nonexistence state of the input signal changes.

Figure 9:
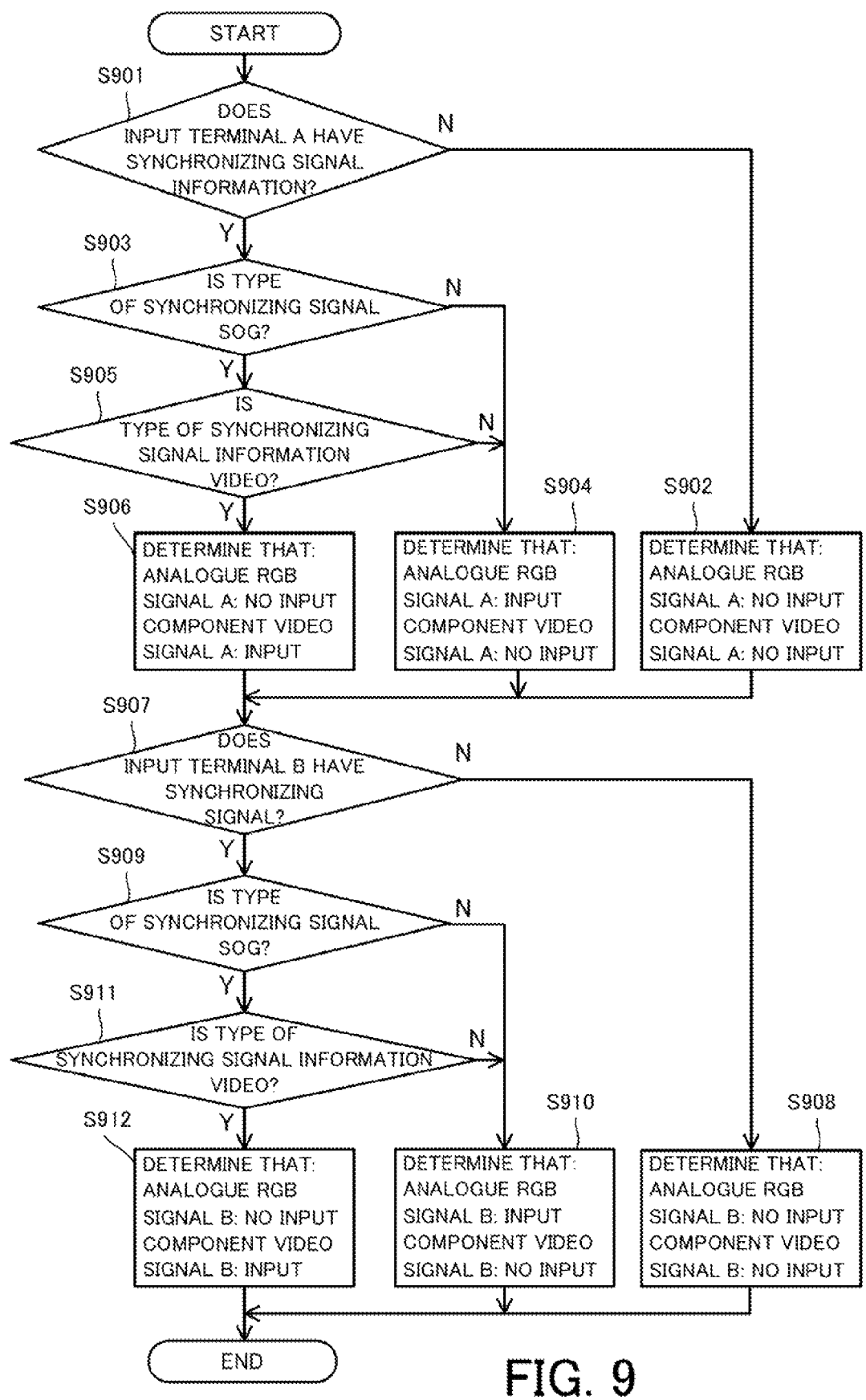
FIG. 9 illustrates a flow of determining whether or not there is an input signal by an OSD controller illustrated in FIG. 6 according to the third embodiment.

FIG. 9 illustrates a flow of determining whether or not there is an input signal by the OSD controller 16. In other words, the OSD controller 16 serves as an identifying unit configured to identify a type of an input signal input to the selected channel based upon the synchronizing signal information stored in the memory 14.

From S901 to S906, it is determined whether or not there is an input of the analogue RGB signal A or an input of the CV signal A to the input terminal A1. From S907 to S912, it is determined whether or not there is an input of the analogue RGB signal B or an input of the CV signal B to the input terminal B2. The determining flow for the input terminal B2 is similar to the determining flow for the input terminal A1 except for the terminal name. Therefore, a description will be given of the determining flow of the input terminal A1.

In S901, it is determined whether or not the synchronizing signal information of the input terminal A has been registered from the memory 14. When it has already been registered, then the flow moves to S903, and when it has not yet been registered, then the flow moves to S902. In S902, it is determined that there is no input of the analogue RGB signal A and there is no input of the CV signal A. In S903, the type of the synchronizing signal is identified based upon the synchronizing signal information of the input terminal A1 registered in the memory 14. When it is SOG, then the flow moves to S905, and when it is not the SOG, then the flow moves to S904. In S904, it is determined that there is an input of the analogue RGB signal A and there is no input of the CV signal A. In S905, the vertical line number and the horizontal synchronizing period are read out of the synchronizing signal information of the input terminal A1 registered in the memory 14, and compared with a CV signal format list (not illustrated). The CV signal format list is previously stored in the display apparatus, and the vertical line number and the horizontal synchronizing period of the CV signal format which can be displayed are read out. When the vertical line number and the horizontal synchronizing period read out of the memory 14 approximately accord with those of one format in the CV signal format list, then they are determined to be a video signal. When it is determined to be the video signal, then the flow moves to S906, and when it is not determined, then the flow moves to S904. In S906, it is determined that there is no input of the analogue RGB signal A and there is an input of the CV signal A. The above determining flow is performed before the input selecting menu 70 is displayed. While the input selecting menu is being displayed, the flow of determining whether or not there is an input signal is repeated at proper intervals and the OSD display content is updated with a change.

This control holds the measured synchronizing signal information in the memory 14 even when the input is switched by the input selector 13, and thus the type of the input signal can be correctly determined. The user can recognize the type of the input signal, and is less likely to make a selection by mistake.

Similar to the first embodiment, this embodiment utilizes the D-Sub15 pin terminal for each of the input terminals A1 and B2, but a DVI-I terminal or 5BNC terminal may be used for similar effects. In addition, there are two input terminals and four types of input signals in this embodiment, but the increased number of input terminals and the increased number of types of input signals may be provide similar effects. Moreover, as in the second embodiment, the similar effect can be obtained even when the signal detector 4 is replaced with the signal change detector 11.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-098341, filed Apr. 24, 2012 which is hereby incorporated by reference herein in its entirety.

What is claimed is:

1. A display apparatus configured to display an image corresponding to an image signal, the display apparatus comprising:
    a channel switch configured to select one of a plurality of channels by switching the channel for the image signal to be input;
    a detector configured to detect whether or not there is the image signal based on a synchronizing signal in the plurality of channels;
    an image processor commonly provided to the plurality of channels, and configured to provide processing to the image signal of a selected channel selected by the channel switch in accordance with a parameter;
    a parameter acquirer commonly provided to the plurality of channels, and configured to obtain the parameter in accordance with a format of the image signal of the selected channel;
    a memory controller configured to store the parameter obtained by the parameter acquirer in a storage area in a memory corresponding to the selected channel, and to hold the parameter for a first channel in the memory while the detector detects the image signal in the first channel even after the channel switch switches from the first channel to a second channel, the memory controller being further configured to delete the parameter for the first channel in the memory when the detector detects no image signal in the first channel; and
    an image processing controller configured to read the parameter and set the parameter to the image processor without acquiring a new parameter from the parameter acquirer when the parameter for the selected channel is stored in the memory.

2. The display apparatus according to claim 1, wherein the detector is further configured to detect a change of the image signal, and
    wherein the memory controller holds the parameter for the first channel until the detector detects the change of the image signal for the first channel, and deletes the parameter for the first channel from the memory when the detector detects the change of the image signal for the first channel.

3. A display apparatus configured to display an image corresponding to an image signal, the display apparatus comprising:
    a channel switch configured to select one of a plurality of channels by switching the channel for the image signal to be input;
    a detector configured to detect whether or not there is the image signal based on a synchronizing signal in the plurality of channels;
    a synchronizing signal information acquirer commonly provided to the plurality of channels, and configured to acquire synchronizing signal information containing the number of horizontal synchronizing signal pulses per at least one vertical synchronizing period for the image signal of a selected channel selected by the channel switch;
    a memory controller configured to store the synchronizing signal information acquired by the synchronizing signal information acquirer in a storage area in a memory corresponding to the selected channel, and to hold the synchronizing signal information for a first channel in the memory while the detector detects the image signal in the first channel even after the channel switch switches from the first channel to a second channel, the memory controller being further configured to delete the synchronizing signal information for the first channel in the memory when the detector detects no image signal in the first channel; and
    an identifier configured to identify a type of the image signal to be input to the selected channel, based upon the synchronizing signal information stored in the memory.

4. The display apparatus according to claim 3, wherein the detector is further configured to detect a change of the image signal, and
    wherein the memory controller holds the synchronizing signal information for the first channel until the detector detects the change of the image signal for the first channel, and deletes the synchronizing signal information for the first channel from the memory when the detector detects the change of the image signal for the first channel.

5. A display apparatus configured to display an image corresponding to an image signal, the display apparatus comprising:
- a plurality of terminals, each of which is connected to a plurality of channels;
- a channel switch configured to select one of the plurality of channels by switching the terminal for the image signal to be input;
- a detector configured to detect whether or not there is the image signal in each terminal based on a synchronizing signal in the plurality of channels;
- an image processor commonly provided to the plurality of channels, and configured to provide processing to the image signal of a selected channel selected by the channel switch in accordance with a parameter;
- a parameter acquirer commonly provided to the plurality of terminals, and configured to obtain the parameter in accordance with a format of the image signal of the selected channel;
- a memory controller configured to store the parameter obtained by the parameter acquirer in a storage area in a memory corresponding to the selected channel, and to hold the parameter for a first channel in the memory while the detector detects the image signal in the first channel connected to a first terminal among the plurality of terminals even after the channel switch switches from the first channel to a second channel connected to a second terminal different from the first terminal among the plurality of terminals, the memory controller being further configured to delete the parameter for the first channel in the memory when the detector detects no image signal in the first channel; and
- an image processing controller configured to read the parameter and set the parameter to the image processor without acquiring a new parameter from the parameter acquirer when the parameter for the selected channel is stored in the memory.

6. The display apparatus according to claim 5, wherein the detector is further configured to detect a change of the image signal, and
wherein the memory controller holds the parameter for the first channel until the detector detects the change of the image signal for the first channel, and deletes the parameter for the first channel from the memory when the detector detects the change of the image signal for the first channel.

7. A display apparatus configured to display an image corresponding to an image signal, the display apparatus comprising:
- a plurality of terminals, each of which is connected to a plurality of channels;
- a channel switch configured to select one of the plurality of channels by switching the terminal for the image signal to be input;
- a detector configured to detect whether or not there is the image signal in each terminal based on a synchronizing signal in the plurality of channels;
- a synchronizing signal information acquirer commonly provided to the plurality of terminals, and configured to acquire synchronizing signal information containing the number of horizontal synchronizing signal pulses per at least one vertical synchronizing period for the image signal of a selected channel selected by the channel switch;
- a memory controller configured to store the synchronizing signal information acquired by the synchronizing signal information acquirer in a storage area in a memory corresponding to the selected channel, and to hold the synchronizing signal information for a first channel in the memory while the detector detects the image signal in the first channel connected to a first terminal among the plurality of terminals even after the channel switch switches from the first channel to a second channel connected to a second terminal different from the first terminal among the plurality of terminals, the memory controller being further configured to delete the synchronizing signal information for the first channel in the memory when the detector detects no image signal in the first channel; and
- an identifier configured to identify a type of the image signal to be input to the selected channel, based upon the synchronizing signal information stored in the memory.

8. The display apparatus according to claim 7, wherein the detector is further configured to detect a change of the image signal, and
wherein the memory controller holds the synchronizing signal information for the first channel until the detector detects the change of the image signal for the first channel, and deletes the synchronizing signal information for the first channel from the memory when the detector detects the change of the image signal for the first channel.

* * * * *